Figure 1:
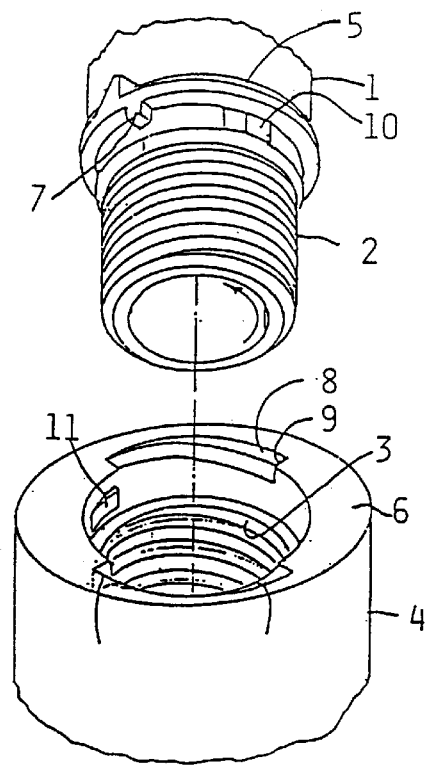

United States Patent
Larsen et al.

[11] Patent Number: 5,906,398
[45] Date of Patent: May 25, 1999

[54] THREADED JOINT FOR TWO TUBULAR PLASTIC PARTS

[75] Inventors: Andre Larsen, Dragør; Søren Mikkelsen, Ballerup, both of Denmark

[73] Assignee: Novo Nordisk A/S, Bagsvaerd, Denmark

[21] Appl. No.: 08/860,332

[22] PCT Filed: Feb. 1, 1996

[86] PCT No.: PCT/DK96/00054

§ 371 Date: Jun. 23, 1997

§ 102(e) Date: Jun. 23, 1997

[87] PCT Pub. No.: WO96/23999

PCT Pub. Date: Aug. 8, 1996

[51] Int. Cl.⁶ .................................................. F16L 35/00
[52] U.S. Cl. .............................. 285/24; 285/390; 285/423
[58] Field of Search .............................. 285/24, 27, 390, 285/355, 423, 334; 403/343

[56] References Cited

U.S. PATENT DOCUMENTS

| | | |
|---|---|---|
| 873,659 | 12/1907 | Blood ....................................... 285/390 |
| 1,465,484 | 8/1923 | Richter . |
| 1,645,032 | 10/1927 | Wilson ................................. 285/391 X |
| 2,029,798 | 2/1936 | Schellin ............................... 285/390 X |
| 2,179,193 | 4/1939 | Parrish . |
| 4,050,721 | 9/1977 | Streit ................................... 285/355 X |
| 5,015,014 | 5/1991 | Sweeney .............................. 285/423 X |
| 5,507,538 | 4/1996 | Phillips .................................... 285/390 |

*Primary Examiner*—Dave W. Arola
*Attorney, Agent, or Firm*—Steve T. Zelson, Esq.; Elias J. Lambiris, Esq.

[57] ABSTRACT

In a joint for joining a first and a second part so that these first and second parts maintain a predefined rotational position in relation to each other, where the joint comprises an internal thread (33) in the firs part (34), which internal thread has an inner end and an outer free end receiving an outer free end of a corresponding external thread (22) on the second part (21) which external thread has an inner end adjacent to the second part, the free end of the ridge and the inner end of the groove forming the threads are bounded by surfaces (27, 39) lying in a plane through the axis of the threads, and the length of the threads are so adapted that a plane end surface of the ridge of one thread engages the plane end surface of the groove of the other thread when the two parts are screwed together and occupy the predefined mutual rotational position.

10 Claims, 1 Drawing Sheet

THREADED JOINT FOR TWO TUBULAR PLASTIC PARTS

CROSS-REFERENCE TO RELATED APPLICATIONS

This application is a 35 U.S.C. 371 national application of PCT/DK96/00054 filed Feb. 1, 1996 and claims priority under 35 U.S.C. 119 of Danish application 0115/95 filed Feb. 1, 1995.

The invention relates to a joint for joining two tubular plastic parts together by a threaded joint.

By constructing apparatus comprising plastic parts, joints are often provided by screwing tubular plastic parts together. By manufacturing medical equipment so as pen shaped injection syringes such a syringe may be provided by accommodating a cylinder ampoule in a housing comprising two tubular members which are screwed together, one member having an outer thread engaging an inner thread in the other member. The outer thread is provided on a cylindric part of the fist member, which cylindric part has a smaller diameter than the main diameter of the tubular member. Thereby the thread appears with a free end and an end adjacent to the first tubular member leaving, due to the different diameters of the threaded cylindric part and the tubular part, a shoulder against which the end surface at an open end of the second member may abut when the first member is screwed with its cylindric externally threaded part into an open end of the second member having an internal thread at this open end.

When plastic parts are screwed together in this way, two problems must be realized. One problem is that if the joint is tightened to provide a safe and locking abutment between the said end surface of the second element and the shoulder on the first element, stress impacts due to varying temperature may cause the plastic parts forming the joint to crack. Consequently care must be taken that the joint is only tightened to a degree allowing possible thermal movements of the plastic parts. Another problem is that it is often wanted that the two joined parts have a certain rotational position relative to each other, e.g. when marks on one of the part must be aligned with marks on the other part when the two part are screwed together. The treads must then be so adapted that the marks are aligned when the joint is appropriately tightened, but it will often be possible to tighten the joint a bit more. This will bring the marks out of alignment and may be damaging to the plastic parts as mentioned above.

Consequently it is necessary to provide a stop which locks the relative rotation of the parts to the rotational position in which the marks are aligned and the tightening of the joint is loose enough to not damage the plastic parts.

According to the invention this is obtained by a joint for joining a first and a second part so that this first and second part maintain a predefined rotational position in relation to each other, the joint comprising an internal thread in the first part the internal thread of which has an inner end and an outer free end receiving an outer free end of a corresponding external thread on the second part the external thread of which has an inner end adjacent to the second part, characterized in that a free end of the ridge and the inner end of the groove forming the threads are bounded by surfaces lying in a plane through the axis of the threads, and that the length of the threads are so adapted that a plane end surface of the ridge of one thread engage the plane end surface of the groove of the other thread when the two parts are screwed together and occupy the predefined mutual rotational position.

Appropriately the free ends of the ridges of both threads and the inner ends of both grooves may be bounded by surfaces lying in a plane through the axis of the threads.

When by each thread the outer end of the ridge is 180° displaced from the inner end of the groove a good distribution of the abutment forces are obtained.

The thread may be a multiple thread to obtain a good joint with a minimum of screwing.

Figure 4:
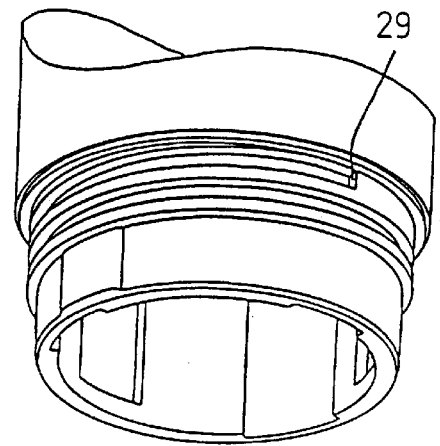
Figure 2:
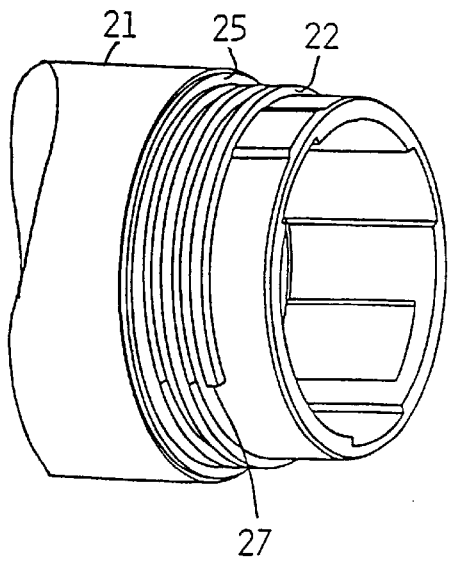
Figure 3:
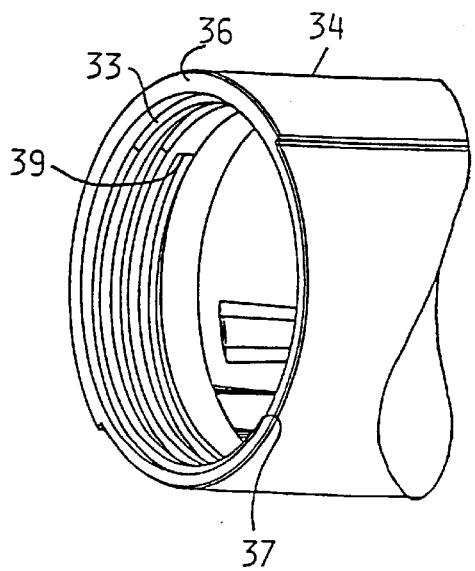

In the following the invention will be described with references to the drawings, wherein FIG. 1 shows a joint according to the known art, FIG. 2 shows the male part of a joint according to the invention, FIG. 3 shows the female part of a joint according to the invention, and FIG. 4 shows the male part of FIG. 2 in another rotational position.

The joint according to the known art as shown i FIG. 1 comprises a male part 1 carrying an external thread 2 which thread fits into an internal thread 3 in a female part 4. The male part 1 is at the inner end of the thread provided with a flange 5 designed for abutting an end surface 6 of the female part 4 when the parts are screwed together.

When the male and the female parts are almost screwed together, a protrusion 7 on the flange of the male part 1 follows a cut out 8 parallel with the thread 3 in the female part 4 to stop the screwing by abutment against a plane end surface 9 of the cut out 8. The protrusion 7 and the end surface 9 of the cut out 8 are so designed that the screwing is stopped when the male and the female parts are in a wanted rotational position in relation to each other and before the mutual abutment pressure between the flange 5 and the end surface 6 of the female part attains an unacceptable value. At the inner end of the thread 2 on the male part a sawtooth projection 10 is provided. Just before the protrusion 7 engages the surface 9 the sawtooth projection 10 will ride over a ramp shaped protrusion 11 at the outer end of the thread 3 in the female part and the steep flanks of these protrusions will get into mutual engagement at the same time as the protrusion 7 abuts the surface 9 so that the male and the female parts are locked together. It shall be noticed that the cut out is cut further into to the material than the bottom of the thread and only can be made due to the relative large wall thickness of the male part.

In FIGS. 2 and 3 showing a male part 21 and a female part 34 of a the joint, respectively, the male part 21 has an external thread 22 designed for engagement with an internal thread 33 in the female part. The front end of the external thread is bounded by a surface 27 lying in a plane through the axis of the male part 21. Correspondingly the front end of the internal thread is bounded by a surface 37 lying in a plane through the axis of the female part 34. The inner end of the groove of the external thread 22 is bounded by a surface 29 lying in a plane through the axis of the male part 21, and correspondingly the inner end of the groove of the internal thread 33 is bounded by a surface 39 lying in a plane through the axis of the female part 34. The threads are so designed that when the surface 27 abuts the surface 39, the surface 37 will abut the surface 29 when the two parts 21 and 34 are screwed together. As further the surfaces 27, 29 of the male part and the surfaces 37 and 39 of the female part are provided at well defined rotational positions relative to the respective parts, the mutual abutment of the surfaces 27, 39 and 37, 29, respectively, will ensure a well defined positioning of the two parts relative to each other when these two parts are screwed together until said mutual abutment is obtained. Not shown lock mechanisms may be provided to maintain the parts in this position or the locking effect obtained by an end surface 36 of the female part 34 pressing against a shoulder 25 at the inner end of the external thread 22 of the male part 21 may be relied on.

The force by which the end surface 36 abuts the shoulder 25 may be adjusted during the moulding of the female part by displacing a moulding core axially. Hereby the position of the thread may be adjusted in relation to the end surface 36 without changing the rotational position of the surfaces 37 and 39 in relation to the female part as a whole.

FIG. 4 shows the male part in a rotational position revealing the surface 29 at the inner end of the groove of the external thread 22.

The joint is shown with a single thread, but the thread may be a multiplex thread without deviating from the scope of the invention. The thread is shown as a square thread, but other shapes may as well be used.

What is claimed is:

1. In combination, first and second tubular plastic parts, wherein an end portion of said first part includes an external thread having a leading end, and wherein said external thread extends helically about an external surface at least a first turn and part of a second turn such that said first part includes a first channel;

wherein an end portion of said second part includes an inner thread having a leading end, wherein said internal thread extends helically on an internal surface of said second part at least a first turn and part of a second turn such that said second part includes a second channel, and wherein said external thread is sized to be received within said second channel, and said internal thread is sized to be received within said first channel such that said parts can be screwed together and said interlocking threads form a joint between said parts; and wherein at least one of said channels includes an end surface located at a predetermined position for engaging the leading end of the thread of the other part to establish a predefined rotational position between said parts when screwed together.

2. The combination as recited in claim 1, wherein said leading end of said one thread includes an engagement surface, and wherein said engagement surface and the corresponding end surface are oriented so as to be at least substantially perpendicular to the direction of travel of such leading end within its respective channel.

3. The combination as recited in claim 1, wherein the other channel includes a second end surface located at a predetermined position for engaging the leading end of the other thread when said parts are at said predefined rotational position.

4. The combination as recited in claim 3, wherein the leading ends of said threads each has an engagement surface, and wherein said engagement surfaces and the corresponding end surfaces are oriented so as to be at least substantially perpendicular to the direction of travel of the leading ends within their respective channels.

5. The combination as recited in claim 4, wherein the two said end surfaces are displaced 180 degrees apart, so as to be diametrically opposed.

6. The combination as recited in claim 1, wherein the threads on the respective parts are multiple threads.

7. The combination as recited in claim 1, wherein said threads have a rectangular cross-section.

8. The combination as recited in claim 1, wherein said first part has an annular shoulder, wherein said second part has an annular end surface, and wherein in said predefined rotational position said end surface abuts said shoulder with a force, in an axial direction, which is predetermined by the location of said end surface.

9. The combination as recited in claim 1, wherein each thread has multiple turns.

10. The combination as recited in claim 1, wherein the thread of said other part includes an inner end opposite to its leading end, wherein an end portion of said channel is disposed on a side of said inner end opposite to said first turn, and wherein said end surface is located in said portion.

* * * * *